United States Patent Office 3,557,061
Patented Jan. 19, 1971

3,557,061
STABILIZED SUSPENSION POLYMERIZATION
Herman Christian Hamann, Melrose Park, Pa., assignor to Rohm and Haas Company, Philadelphia, Pa., a corporation of Delaware
No Drawing. Filed Jan. 16, 1969, Ser. No. 791,797
Int. Cl. C08f 1/11
U.S. Cl. 260—78.4                                    6 Claims

ABSTRACT OF THE DISCLOSURE

Using a salt of a vinylimidazoline or a vinyltetrahydropyrimidine polymer there is provided an improved suspension polymerization process. The process permits the polymerization of water-soluble monomers, preferably, in the presence of aqueous salt solutions which heretofore have presented great difficulties because of the limited solubility or dispersibility of common dispersants in such salt solution.

This invention relates to suspension (bead or pearl) polymerization which, as is commonly known, requires a dispersing or suspending agent. The dispersing agents affect the size, shape and to some extent the chemical characteristics of the resulting polymers. In the suspension polymerization of water-soluble monomers it is common to use a large amount of a salt to limit the solubility of the monomer in the aqueous phase. Any water-soluble salt may be used for this purpose. Typical salts are sodium chloride, sodium bromide, sodium sulfate, magnesium chloride, calcium chloride, tetramethylammonium chloride and the like. In so doing considerable difficulty has been encountered with common dispersants which are typically organic, water-soluble, polymeric materials and which may be cationic, anionic or non-anionic in nature. The difficulties apparently arise from a lack of solubility of the dispersants in brine or salt solution or, even if soluble, the inability of the common dispersant to function properly in the presence of a solution of a strong electrolyte. Similar difficulties are also encountered when mixtures of water-soluble and water-insoluble monomers are suspension polymerized.

It has now been found that salts of vinylimidazoline and/or vinyltetrahydropyrimidine polymers are unusually effective as dispersants in the suspension polymerization of water-soluble monomers and mixtures of water-soluble and water-insoluble monomers in the presence of salt solutions. Moreover, the salt dispersants used in the present invention permit the production of polymers with outstanding properties.

The water-soluble monomers which are useful in the present invention are addition-polymerizable monomers. Typical examples include acrylic acid, methacrylic acid, acrylamide, methacrylamide, hydroxyethyl acrylate, hydroxyethyl methacrylate, carboxyethyl acrylate, maleic acid, fumaric acid, itaconic acid, aconitic acid, citraconic acid, acrylonitrile and vinyl pyridine. Comonomers polymerizable with the water-soluble monomers are any water-insoluble monomer which will undergo vinyl polymerization. Typical examples are styrene, vinyl toluene, divinylbenzene, trivinylbenzene, alkyl esters of acrylic and methacrylic acid with 1–22 carbon atoms, vinyl chloride, vinyl acetate, vinyl octoate, ethyl vinyl ether, octyl vinyl ether and the like.

In producing the polymers, copolymers and crosslinked interpolymers, the monomer mixtures are subjected to polymerization in the presence of a catalyst. The catalysts which form free radicals necessary for the polymerization are conventional and are usually organic peroxides. Typical examples include benzoyl peroxide, lauroyl peroxide, t-butyl perbenzoate, cumene hydroperoxide, azo-bis-isobutyronitrile and the like. The polymerization is preferably carried out using a free radical catalyst; however, radiation induced polymerization can also be employed, using such high energy radiation as X-rays or gamma-rays.

Polymerization times, temperatures and pressures may vary considerably depending on the monomer system used, type and concentration of catalysts. Polymerizations may require from two or three minutes to several hours, suitable temperatures range from less than 0° C. to more than 200° C., pressures from less than one atmosphere to several atmospheres. In a preferred embodiment using a water-soluble olefinic acid and an olefinic crosslinking agent, the polymerization was effected by heating the mixture to a temperature in the range of from about 65 to about 90° C. in the presence of 1 (one) wt. percent lauroyl peroxide for 1.5 hours.

The salts of vinylimidazoline and/or vinyltetrahydropyrimidine polymers are disclosed and claimed in U.S. application No. 254,585, filed on Jan. 29, 1963 now U.S. Pat. No. 3,406,139, and in British Pat. 1,056,793. As more fully disclosed in these references, the salts of such polymers contain recurring units of the formula:

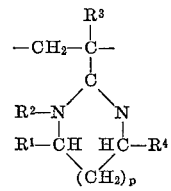

in which p represents zero or 1; $R^1$ when not joined to $R^4$ represents hydrogen or a hydrocarbon group; $R^2$ represents hydrogen, a hydrocarbon group or a

group where z is an integer of 1 to 4; $R^3$ represents hydrogen, halogen, an alkoxycarbonyl group, a haloalkyl group, or a hydrocarbon group which is free of addition-polymerizable unsaturated groups; $R^4$ when not joined to $R^1$ represents hydrogen or a hydrocarbon group; and $R^1$ and $R^4$ when joined together represent together with the chain of two or three carbon atoms to which they are attached, a phenylene, cyclopentylene or cyclohexylene group, or such a group substituted by one or more alkyl groups of, for example, 1 to 4 carbon atoms.

When the $R^1$—$R^4$ symbols in Formula I represent hydrocarbon groups these will typically be alkyl, aryl, alkaryl or aralkyl particularly these groups in which the alkyl portion has 1 to 4 carbon atoms and the aryl portion has 6 carbon atoms.

When $R^3$ represents halogen or a halogen-containing group it may, for example, be chlorine or bromine or chloroalkyl. When $R^3$ represents an alkoxycarbonyl group it will usually contain not more than 5 carbon atoms.

While the substituents $R^1$ to $R^4$ may have non-polymerizable olefinic and/or acetylenic unsaturation it is preferred that they are aromatic or saturated aliphatic groups. When R¹, R², and R⁴ represent an alkyl group, generally the alkyl group does not have more than 18 carbon atoms and when these R symbols represent an aryl group, generally the aryl group does not contain more than 14 carbon atoms. When R³ is an alkyl group, generally it does not exceed 4 carbon atoms, more specifically 1 carbon atom; and, when it is an aryl group, generally it does not exceed 6 carbon atoms.

The alkyl groups represented by the R symbols may be straight or branched-chain and examples are methyl, ethyl, butyl, isopropyl, hexyl, isodecyl, hexadecyl and octadecyl. When the R symbols represent aryl, the aryl group may, for example, be phenyl, benzyl, ethyl benzyl and phenyl ethyl.

The polymers may comprise vinylimidazoline recurring units, in which case $p$ equals zero; or, the polymers may contain vinyltetrahydropyrimidine recurring units, in which case $p$ equals 1. The polymers may also comprise both vinylimidazoline and vinyltetrahydropyrimidine recurring units. The recurring vinylimidazoline and/or vinyltetrahydropyrimidine units may or may not be the same in any one polymer molecule.

The polymers which form the salts useful in this invention may vary widely in molecular weight. Generally, the polymers vary in average molecular weight from 500 to ten million, or even fifty million. For certain applications, such as for a dispersant, a molecular weight of at least about 1,000 is recommended; preferably, the molecular weight will be in the range of from about 10,000 to about 3,000,000.

A particularly favorable class of polymers comprises those which are water-soluble. Such water-soluble polymers are preferably essentially completely linear although sometimes they may contain as much as 10 mole percent of crosslinked molecules. The hydrophilicity of the polymers is readily adjusted by selection of an appropriate precursor nitrile polymer which by appropriate choice of a comonomer polymerized with the nitrile monomer can have any selected hydrophilic or hydrophobic properties.

Typical salts useful in this invention are those of the formula:

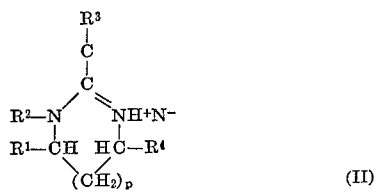

(II)

in which A⁻ is a negative salt-forming radical. Examples of such negative radicals include halides, such as chloride, bromide, and iodide, sulfate, sulfite, bisulfate, bisulfite, methyl sulfate bisulfate, acetate, tartrate, propionate, biphosphate, citrate, phosphate, sulfonate, oxalate and ethylenediaminetetraacetate.

The salts can be prepared by treating the polymers with an acid, either organic or inorganic. It is preferred that the acid be a strong acid. Typical acids are sulfuric, hydrochloric, phosphoric, nitric, sulfamic, oxalic, acetic, glycolic, diglycolic, sulfonic, benzene sulfonic, paratoluene sulfonic, methane sulfonic, ethylenediaminetetraacetic acid, and other similar acids. Acid salts may also be used as ammonium sulfate, alkali metal bisulfate and sodium acid phosphate salts. With solid acids, an aqueous reaction medium is suitable.

The amount of acid, of any particular acidity, used may vary greatly, depending on the extent of conversion to the salt which is desired and the valency of the acid. The salts of the vinylimidazoline polymers may be mixtures of the salt with the free base from which the salt is derived or they may be completely in the salt form. A distinct advantage of the salts is that they have increased stability against hydrolysis. Preferred salts for use in this invention are those which are water-soluble. The salts are used as dispersants in the present invention in an amount of about 0.1% to 5% by weight, based on the weight of the polymerizable monomers.

The following examples are illustrative of the present invention. All parts and percentages are by weight and temperatures are in °C. unless otherwise stated.

EXAMPLE 1

To a 2 l. 3-neck flask fitted with a stirrer, thermometer, nitrogen sweep, addition funnel and reflux condenser is charged 364.4 g. of tap water, 141.7 g. of sodium chloride and 4.55 g. of the bisulfate salt of poly(2-vinylimidazoline). The mixture is stirred until solution is complete. To this, without stirring, is added a solution of 181.8 g. glacial methacrylic acid containing 250 p.p.m. monomethyl hydroquinone (MEHQ), 18.2 g. commercial divinylbenzene (54.8% active), 41 g. methyl iso-butyl carbinol and 2.4 g. lauroyl peroxide. Stirring is begun and there is an immediate formation of a dispersion as shown by the sparkling appearance of the dispersion. The dispersion is heated to 65° C. and held at that temperature until the onset of the exotherm (ca. 10 min.); the dispersion becoming white and accompanied with a loss of sparkle. The exothermic temperature is held at 65–67 by shot-wise addition of sodium chloride brine (28%) and is over in about 20 min. The temperature is now increased to 90° C. and held for 1.5 hr. The solvent is removed by azeotropic distillation. The resin is washed with tap water, and leached for 5 hours with boiling water to remove all extraneous material and filtered. This yields, in 96% conversion, a resin consisting of hard, white sperical beads having a cation exchange capacity of 10.4 meq./g. (dry).

EXAMPLE 2

To a 2 l. flask fitted with a stirrer, thermometer, nitrogen sweep, reflux condenser and addition funnel is charged 403.1 g. tap water, 156.8 g. sodium chloride and 5.04 g. the bisulfate salt of poly(2-vinylimidazoline). The mixture is stirred until solution of 163.5 g. glacial acrylic acid (200 p.p.m. MEHQ), 36.5 g. commercial divinylbenzene (54.8% active), 66.6 g. toluene and 2.7 g. lauroyl peroxide. Stirring is started and there is an immediate formation of a suitable dispersion. The polymerization is effected as in Example 1 to give in 95.1% conversion a resin consisting of hard, white spherical beads with a cation exchange capacity of 11.7 meq./g. (dry).

EXAMPLE 3

To a 2 l. 3-neck flask fitted with a stirrer, thermometer, nitrogen sweep and reflux condenser is charged, with stirring, 171 g. sodium chloride, 423 g. water and 1.8 g. the bisulfate salt of poly(2-vinylimidazoline). To this is added a solution of 189.7 g. 2-methyl-5-vinyl pyridine, 10.4 g. divinylbenzene (96.1% active) and 2.0 g. azo-bis-isobutyric acid nitrile; a satisfactory dispersion forms immediately. The polymerization is effected by heating the dispersion for 20 hours at 80° C. This yields after washing, a yellowish-brown resin with an anion exchange capacity of 7.63 meq./g. (dry).

EXAMPLE 4

In a manner similar to Example 2 above 125 g. of calcium chloride, 434.5 g. of tap water and 5.0 g. of the bisulfate salt of poly(2-vinyl imidazoline), are stirred until solution is complete. To this is added a mixture of 98.2 g. glacial acrylic acid, 1.8 g. commercial divinylbenzene (54.8% active), 42.9 g. toluene and 1.4 g. of lauroyl peroxide. The polymerization is effected by heating the dispersion to 62° for 10 hours and then to 100° for 2 hours. The resultant product consists of spheroids with a swelling ratio of 102 ml. per gram on conversion to the sodium form. A material of this type is useful as a thickener, binder or mucilage.

EXAMPLE 5

In a similar manner, 151 g. of sodium sulfate, 449.5 g. of tap water and 4.45 g. of the bisulfate salt of poly(2-vinyl imidazoline) is stirred in a two liter flask until solution is complete. To this is added a mixture of 160.8 g. glacial acrylic acid, 10.0 g. maleic anhydride, 29.2 g. commercial divinyl benzene (54.8% active), 66.6 g. of n-butyl alcohol and 2.7 g. of lauroyl peroxide. The polymerization is effected by heating the dispersion to 90° for 1 hour and at 100° for 2.5 hours. The resultant product consisted of hard, white spherical beads with a cation exchange capacity of 12.3 meq./g. (dry).

EXAMPLE 6

A mixture of 71 g. of acrylamide and 72 g. of glacial acrylic acid, 36 g. iso-propyl alcohol and 1.4 g. of benzoyl peroxide are added to a solution of 101.5 g. of calcium chloride, 274.4 g. of tap water and 3.38 g. of the bisulfate salt of poly(2-vinyl imidazoline) with stirring. The resultant dispersion is heated to 78° C. for 15 hours to effect polymerization. The product, after rinsing with methanol, is isolated in 91% yield. A material of this type is useful as a thickener, flocculant or mucilage.

EXAMPLE 7

Preparation of a styrene—1.9% divinylbenzene copolymer using poly(vinyl imidazolinium bisulfate) as dispersant To a stirred solution of 1.5 g. poly(vinyl imidazolinium bisulfate) in 150 g. of tap water is added a solution of 96.6 g. of styrene, 3.4 g. commercial divinyl benzene (55.3% active) and 1.0 g. of benzoyl peroxide; there is an immediate formation of a suitable dispersion. The polymerization is effected by heating the reaction mixture at 81° for 3.5 hours and then for 1 hour at 92° C. The reaction mixture was then cooled, the copolymer washed on a 325 mesh screen, to yield after drying 96.7 g. of clear, spherical beads suitable for further conversion to an ion exchange resin by known procedures.

While the examples given above principally illustrate the suspension polymerization of a water-soluble monomer in an aqueous brine or salt solution, the vinylimidazoline polymeric salts are also useful in accordance with the teachings of this invention in the suspension polymerization of water-insoluble, but water dispersible monomers (or mixtures thereof with water-soluble monomers) and in the presence of water (i.e. non-brine as the aqueous medium, as is more fully illustrated in Example 7 above.

It is obvious that many variations may be made in the polymerization processes of this invention without departing from the spirit and scope thereof as defined in the appended claims.

What is claimed is:

1. In the suspension polymerization of addition polymerizable water-dispersable or water-soluble monomers suspended in an aqueous medium, the improvement which comprises carrying out said polymerization in the presence of a dispersant salt of a polymer containing recurring units of the formula:

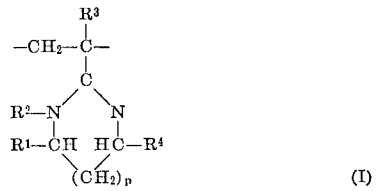

in which $p$ represents zero or 1; $R^1$ when not joined to $R^4$ represents hydrogen or a hydrocarbon group; $R^2$ represents hydrogen, a hydrocarbon group of a

group where $z$ is an integer of 1 to 4; $R^3$ represents hydrogen, halogen, an alkoxycarbonyl group, a haloalkyl group or a hydrocarbon group which is free of addition-polymerizable unsaturated groups; $R^4$ when not joined to $R^1$ represents hydrogen or a hydrocarbon group; and $R^1$ and $R^4$, when joined together, represent together with the chain of two or three carbon atoms to which they are attached, a phenylene, cyclopentylene or cyclohexylene group, or such a group substituted by one or more alkyl groups, the dispersant salt having a molecular weight in the range of about 1,000 to about 3,000,000.

2. A process according to claim 1 in which the aqueous medium is an aqueous salt solution which limits the solubility of the monomer or monomers therein.

3. A process according to claim 2 in which the dispersant salt is present in an amount of from about 0.1% by weight to 5% by weight based on the weight of the polymerizable monomer or monomers.

4. A process according to claim 2 in which at least one of the monomers is selected from the group consisting of acrylic acid, methacrylic acid, acrylamide, methacrylamide, hydroxyethyl acrylate, hydroxyethyl methacrylate, carboxyethyl acrylate, maleic acid, fumaric acid, itaconic acid, aconitic acid, citraconic acid, acrylonitrile and vinyl pyridine.

5. A process according to claim 3 in which the dispersant salt is the bisulfate salt of poly(2-vinyl imidazoline).

6. A process according to claim 5 in which the dispersant salt has a molecular weight in the range of about 10,000 to about 3,000,000.

References Cited

UNITED STATES PATENTS 3,406,139  10/1968  Hurwitz et al. _____ 260—29.6

JOSEPH L. SCHOFER, Primary Examiner

J. KIGHT, Assistant Examiner

U.S. Cl. X.R.

260—34.2, 78.5, 82.1, 85.5, 85.7, 86.1, 86.7, 87.1, 87.3, 87.5, 87.7, 88.1, 88.2, 88.3, 89.1, 89.5, 91.1, 92.8, 93.5, 95, 94.9, 80